(12) United States Patent
Su et al.

(10) Patent No.: US 11,039,368 B2
(45) Date of Patent: *Jun. 15, 2021

(54) DYNAMIC COVERAGE MODE SWITCHING AND COMMUNICATION BANDWIDTH ADJUSTMENT

(71) Applicant: Apple Inc., Cupertino, CA (US)

(72) Inventors: Li Su, San Jose, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/806,288

(22) Filed: Mar. 2, 2020

(65) Prior Publication Data

US 2020/0205052 A1 Jun. 25, 2020

Related U.S. Application Data

(63) Continuation of application No. 16/206,090, filed on Nov. 30, 2018, now Pat. No. 10,609,617, which is a
(Continued)

(51) Int. Cl.
*H04W 36/32* (2009.01)
*H04L 1/00* (2006.01)
(Continued)

(52) U.S. Cl.
CPC .......... *H04W 36/32* (2013.01); *H04L 1/0001* (2013.01); *H04L 1/0025* (2013.01);
(Continued)

(58) Field of Classification Search
CPC .... H04W 36/32; H04W 72/005; H04L 1/0001
(Continued)

(56) References Cited

U.S. PATENT DOCUMENTS

| | | | |
|---|---|---|---|
| 2010/0041365 A1* | 2/2010 | Lott | H04M 15/68 455/406 |
| 2014/0119333 A1* | 5/2014 | Hedlund | H04L 5/0007 370/330 |

(Continued)

FOREIGN PATENT DOCUMENTS

| | | |
|---|---|---|
| CN | 101754282 A | 6/2010 |
| CN | 101969697 A | 2/2011 |

(Continued)

OTHER PUBLICATIONS

Office Action, Application No. JP 2019-511713, dated Feb. 10, 2020, 10 pages.

(Continued)

*Primary Examiner* — John J Lee
(74) *Attorney, Agent, or Firm* — Kowert, Hood, Munyon, Rankin & Goetzef P.C.

(57) ABSTRACT

This disclosure relates to techniques for dynamically changing coverage modes and/or communication bandwidth in a wireless communication system. According to some embodiments, a wireless device may attach to a serving cell associated with a cellular network. A volume of data for upcoming communication with the cellular network may be determined. An indication of a requested communication bandwidth may be provided to the serving cell. The wireless device may communicate data with the serving cell using the requested communication bandwidth. In some instances, a request for narrowband communication bandwidth may result in use of a coverage enhancement mode, while a request for wideband communication bandwidth may result in use of a normal coverage mode.

20 Claims, 6 Drawing Sheets

Related U.S. Application Data continuation of application No. 15/685,601, filed on Aug. 24, 2017, now Pat. No. 10,285,107.

(60) Provisional application No. 62/384,890, filed on Sep. 8, 2016, provisional application No. 62/412,423, filed on Oct. 25, 2016.

(51) Int. Cl.
*H04W 72/00* (2009.01)
*H04W 72/12* (2009.01)
*H04W 88/02* (2009.01)
*H04W 92/02* (2009.01)
*H04W 28/02* (2009.01)

(52) U.S. Cl.
CPC ..... *H04W 72/005* (2013.01); *H04W 72/1205* (2013.01); *H04W 72/1284* (2013.01); *H04W 28/0278* (2013.01); *H04W 88/02* (2013.01); *H04W 92/02* (2013.01)

(58) Field of Classification Search
USPC .......... 455/452.1, 522, 69, 509, 67.11, 456.1
See application file for complete search history.

(56) References Cited

U.S. PATENT DOCUMENTS

| | | | |
|---|---|---|---|
| 2016/0095076 | A1 | 3/2016 | Xiong et al. |
| 2016/0127092 | A1 | 5/2016 | Zhang |
| 2017/0006572 | A1 | 1/2017 | Lee et al. |
| 2017/0070991 | A1 | 3/2017 | Subramanian et al. |
| 2017/0303278 | A1* | 10/2017 | Calin .................. H04B 17/318 |
| 2017/0318606 | A1* | 11/2017 | Lee .................... H04W 74/004 |

FOREIGN PATENT DOCUMENTS

| | | |
|---|---|---|
| CN | 102196564 A | 9/2011 |
| CN | 103582031 A | 2/2014 |
| CN | 104348580 A | 2/2015 |
| CN | 104854898 A | 8/2015 |
| CN | 105635018 A | 6/2016 |
| CN | 105917598 A | 8/2016 |
| EP | 3 240 350 A1 | 1/2017 |
| JP | 2006-287357 | 10/2006 |
| KR | 10-2011-0053386 A | 5/2011 |
| KR | 10-2015-0113018 A | 10/2015 |
| KR | 1020160108383 A | 9/2016 |
| WO | 2012154095 A1 | 11/2012 |
| WO | WO 2102/154095 A1 | 11/2012 |
| WO | WO 2015117028 A1 | 8/2015 |
| WO | WO 2016/025899 | 2/2016 |
| WO | WO 2016/070423 | 5/2016 |
| WO | WO 2016/163127 | 10/2016 |
| WO | 2018049045 | 3/2018 |

OTHER PUBLICATIONS

Lenovo, Discussion on Higher Data Rate for Further eMTC [online], 3GPP TSG-RAN WG1#86 R1-167516, Aug. 12, 2016, Internet <URL:http://www.3gpp.org/ftp/tsg_ran/WG1_RL1/TSGR1_86/Docs/R1-167516.zip>.

NEC, Further Low complexity MTC UEs in Rel-13 [online], 3GPP TSG-RAN WG1#78b R1-143933, Sep. 27, 2014, Internet <URL:http://www.3gpp.org/ftp/tsg_ran/WG1_RL1/TSGR1_78b/Docs/R1-143933.zip>.

Intel Corporation, Higher TBS and VoLTE support [online], 3GPP TSG-RAN WG2#95bis R2-166686, Oct. 1, 2016, Internet <URL:http://www.3gpp.org/ftp/tsg_ran/WG2_RL2/TSGR2_95bis/Docs/R2-166686.zip>.

Catt, Discussion on Low Cost MTC Impacts [online], 3GPP TSG-RAN WG2#85 R2-140072, Jan. 27, 2014, Internet <URL:http://www.3gpp.org/ftp/tsg_ran/WG2_RL2/TSGR2_85/Docs/R2-140072.zip>.

Ericsson, Higher data rates for MTC [online], 3GPP TSG-RAN WG2#95 R2-165397, Aug. 12, 2016, Internet <URL:http://www.3gpp.org/ftp/tsg_ran/WG2_RL2/TSGR2_95/Docs/R2-165397.zip>.

International Search Report and Written Opinion, Application No. PCT/US2017/050505, dated Nov. 30, 2017, 17 pages.

L G Electronics, Inc.; 3GPP Draft R2-162900 "Data Volume Indicator for NB-IOT"; 3rd Generation Partnership Project (3GPP); Mobile Competence Centre, 650, Route Des Lucioles, F-06921, Sophia-Antipolis Cedex, France; vol. RAN WG2, No. 93; St. Julian's, Malta; Feb. 15-19, 2016; XP051082630; retrieved from the Internet on Apr. 2, 2016; 4 pages.

Office Action, Application No. KR 10-2019-7005692, dated Feb. 18, 2020, 9 pages.

Examination Report in India application No. 201917000899 dated Aug. 14, 2020, 6 pages.

\* cited by examiner

DYNAMIC COVERAGE MODE SWITCHING AND COMMUNICATION BANDWIDTH ADJUSTMENT

PRIORITY INFORMATION

This application is a continuation of U.S. patent application Ser. No. 16/206,090, entitled "Dynamic Coverage Mode Switching and Communication Bandwidth Adjustment," filed Nov. 30, 2018, which is a continuation of U.S. patent application Ser. No. 15/685,601, entitled "Dynamic Coverage Mode Switching and Communication Bandwidth Adjustment," filed Aug. 24, 2017, which claims priority to U.S. provisional patent application Ser. No. 62/384,890, entitled "Dynamic Coverage Mode Switching," filed Sep. 8, 2016, and to U.S. provisional patent application Ser. No. 62/412,423, entitled "Dynamic Communication Bandwidth Adjustment," filed Oct. 25, 2016, which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for dynamically changing coverage mode and/or communication bandwidth in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for dynamically changing between normal coverage and enhanced coverage modes, and for dynamically changing the communication bandwidth used by a wireless device, in a wireless communication system.

As an increasingly diverse set of use cases for wireless communication is developed, so too are the range of types of wireless communication, and in some cases of communication modes. Some devices may be capable of utilizing multiple such modes; for example, some devices may be capable of utilizing more bandwidth at some times (e.g., when radio conditions are good, at times of high and/or demanding user activity, when battery reserves are relatively high, etc.), and also capable of utilizing less bandwidth communication at some times (e.g., when radio conditions are poor, at times of low and/or undemanding user activity, when battery reserves are relatively low, etc.). Additionally or alternatively, some devices may be capable of utilizing normal coverage features (e.g., which may allow for lower latency and/or higher throughput in good radio conditions) at some times, and also capable of utilizing enhanced coverage features (e.g., which may allow for communication in poorer radio conditions than might be possible using normal coverage features, possibly at a cost of higher latency and/or lower throughput) at some times.

Accordingly, techniques are presented herein for dynamically switching between coverage modes and/or communication bandwidths. Note that in some instances, different coverage modes may have different communication bandwidths, such that modifying a wireless device's coverage mode may also modify the wireless device's communication bandwidth, and/or vice versa. Alternatively, coverage modes and communication bandwidths can be configured separately, if desired.

The dynamic switching of coverage modes and/or communication bandwidths may be based on any of various considerations. As one possibility, the amount of communication bandwidth used may depend at least in part on the expected volume of upcoming data communication to and/or from a wireless device. As another possibility, the coverage mode used may depend at least in part on an assessment of current radio conditions experienced by the wireless device. In some instances, battery power levels and/or charging/not charging status of the wireless device may also or alternatively be considered.

Such techniques may allow wireless devices to adapt to changing radio conditions, upcoming communication data volumes, battery reserve level scenarios, and/or other conditions in a manner that may improve user experience, reduce wireless device power consumption, and/or result in more efficient network resource usage, at least according to some embodiments.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
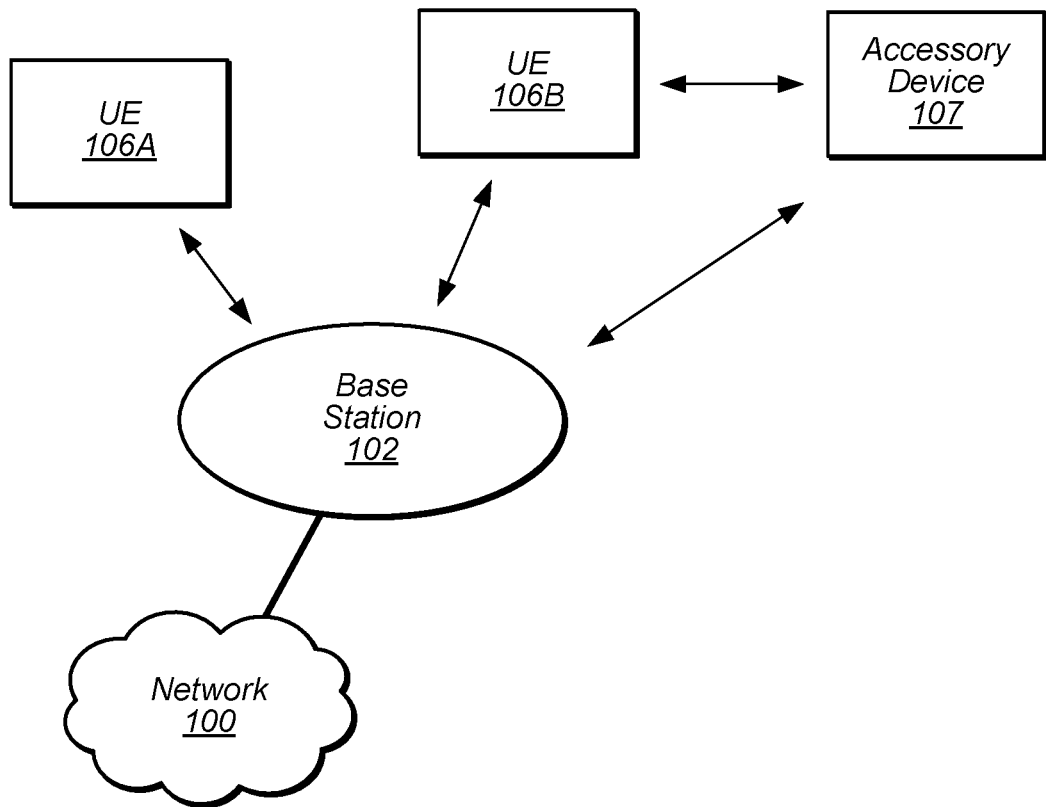
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
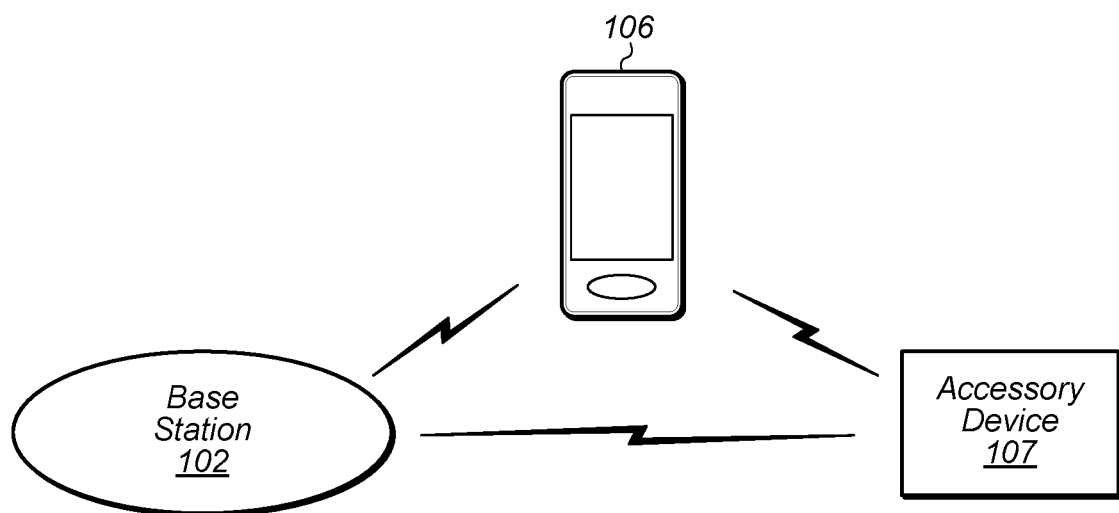
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
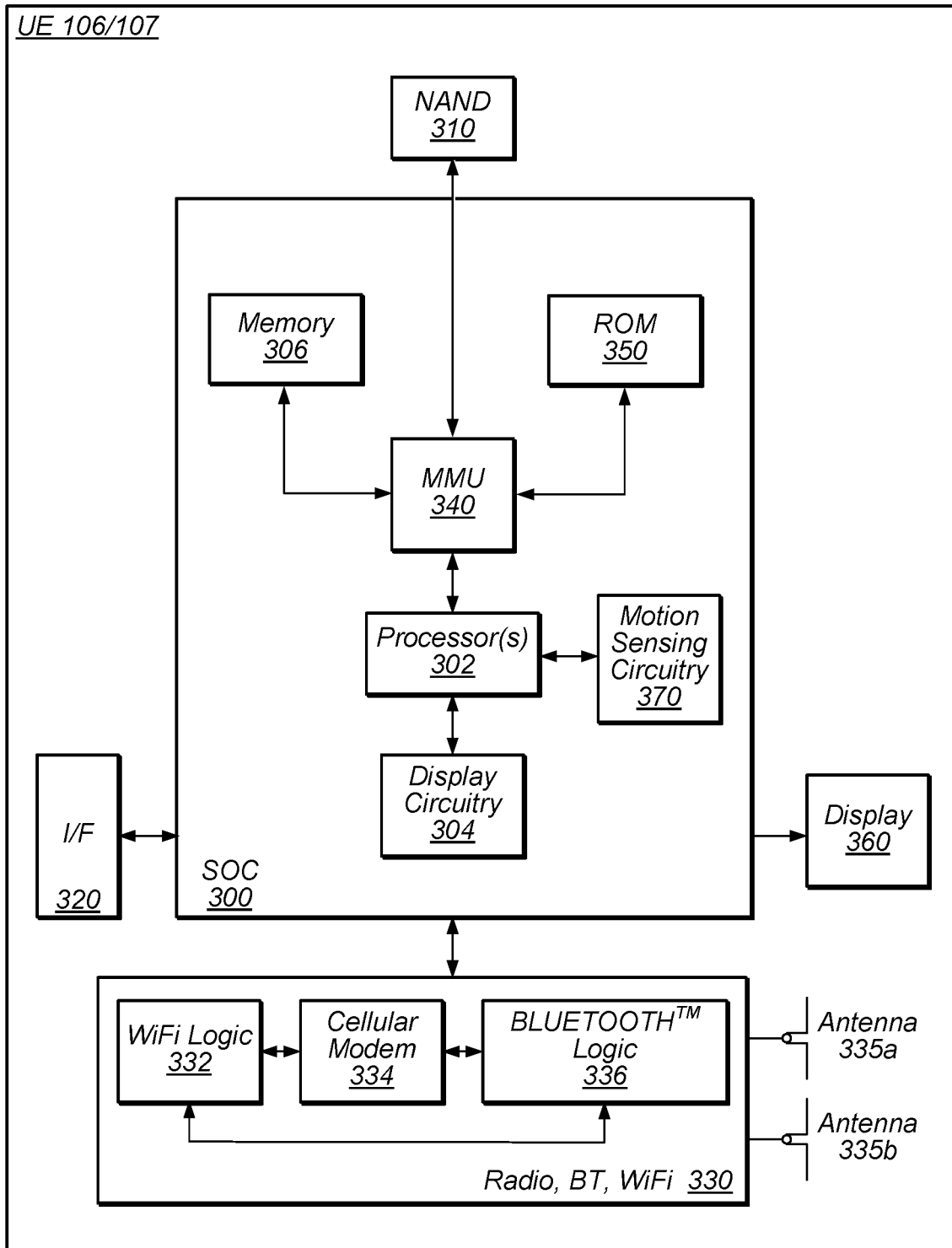
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
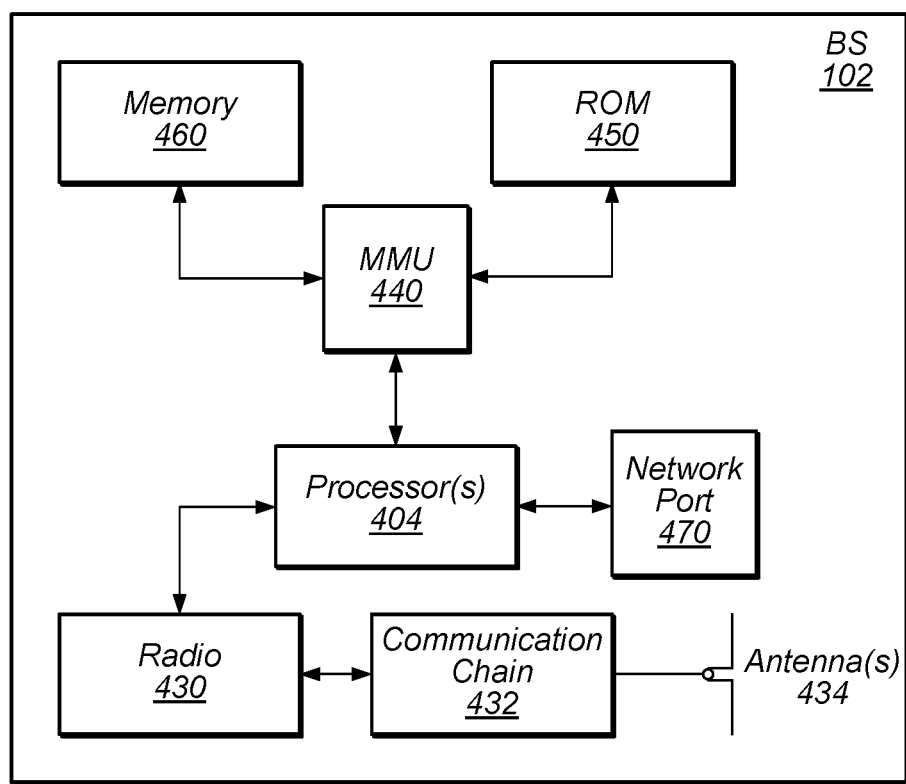
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
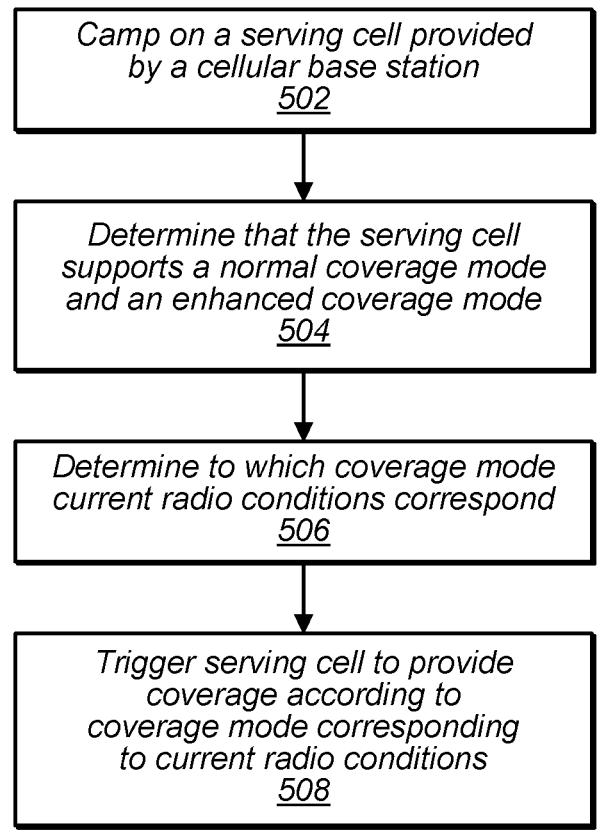
FIG. 5 is a flowchart diagram illustrating an exemplary method for dynamically changing between normal coverage and enhanced coverage modes for a wireless device, according to some embodiments.
Figure 6:
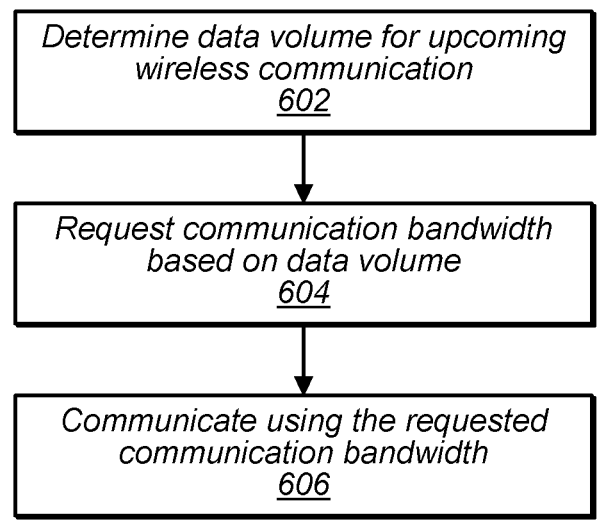
FIG. 6 is a flowchart diagram illustrating an exemplary method for dynamically changing the communication bandwidth used by a wireless device, according to some embodiments.

FIGS. 5-6—Flowchart Diagrams

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/ or other devices forming part of the "Internet of Things", may commonly be designed to perform frequent and/or periodic small data transmissions.

In view of the potentially more limited expected usage scenarios for such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number and/or power level of antennas, battery capability, communication range, etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support link budget limited devices (e.g., in addition to those wireless devices that are not link budget limited).

For example, at least some cellular communication systems may be capable of providing multiple coverage modes, e.g., to help accommodate wireless devices with different communication capabilities and/or operating in different radio conditions. Such coverage modes could include a normal coverage mode (e.g., for wireless devices experiencing good radio conditions) along with one or more enhanced coverage modes (e.g., for wireless devices experiencing varying degrees of poorer radio conditions, whether as a result of inherent device capabilities, current conditions, or some combination thereof), as one possibility.

In many instances a wireless device may predominantly or exclusively operate in just one of the coverage modes offered; for example, a MTC device in a stationary deployment might always operate in an enhanced coverage mode based on its particular combination of device characteristics and typical radio conditions with its serving cell, as one possibility. However, as part of the increasing breadth of device capabilities and intended uses, at least some subset of wireless devices may experience a variety of radio conditions such that they would be better served by different coverage modes at different times. For such devices, providing techniques for switching between different coverage modes may improve operating efficiency, e.g., by extending service coverage range and/or reducing power consumption.

Accordingly, FIG. 5 is a flowchart diagram illustrating a method for dynamically switching between coverage modes, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3 and/or a base station 102 such as illustrated in and described with respect to FIGS. 1, 2, and 4, or more generally in conjunction with any of the computer systems or devices shown in the above Figures, among other devices, as desired. Note that while at least some elements of the method of FIG. 5 are described in a manner relating to the use of communication techniques and/or features associated with LTE and/or 3GPP specification documents, such description is not intended to be limiting to the disclosure, and aspects of the method of FIG. 5 may be used in any suitable wireless communication system, as desired. As shown, the method may operate as follows.

In 502, the wireless device may camp on a serving cell provided by a cellular base station. The serving cell may provide cellular communication service according to a wireless communication technology (or "radio access technology" or "RAT"), such as LTE, NR, UMTS, CDMA2000, etc. To camp on the serving cell, the wireless device may detect that the serving cell exists, obtain timing synchronization and decode system information for the serving cell, and attach to the cell (e.g., by performing an attachment procedure), according to some embodiments. The wireless device may operate in an idle mode (e.g., after releasing an initial connection to perform the attachment procedure), and/or may operate in a connected mode (e.g., while a radio resource control (RRC) connection is established), at various times while camping on the serving cell.

The serving cell may provide the wireless device with a communication link to a cellular network, such as a core network of a cellular service provider (e.g., with which a user of the wireless device may have a subscription and/or other agreement to provide cellular service). When operating in connected mode with the serving cell, the cellular network may thus provide connectivity between the user device and various services and/or devices coupled to the cellular network, such as other user devices, a public switched telephone network, the Internet, various cloud-based services, etc. A variety of possible data types, with different characteristics, may be transmitted via the serving cell. In addition, various signaling messages may be exchanged at various times to establish, maintain, reconfigure, and/or otherwise provide signaling functionality between the wireless device and the serving cell.

In 504, the wireless device may determine that the serving cell supports a normal coverage mode and an enhanced coverage mode. According to some embodiments, the enhanced coverage mode may also be referred to as a "coverage enhancement" or "CE" mode. Additional coverage modes may also be supported, at least in some instances. For example, the serving cell may provide multiple CE modes (e.g., CE modes A and B, according to at least some LTE implementations), each intended to extend coverage to devices experiencing a different range of radio conditions, as one possibility.

The serving cell may advertise which coverage modes it supports. For example, the serving cell may broadcast system information (e.g., in one or more master information blocks (MIBs) and/or system information blocks (SIBs) that indicates that one or more enhanced coverage modes are supported in addition to the normal coverage mode. Additionally, at least according to some embodiments, various characteristics and/or parameters of at least some of the coverage modes supported may be indicated in the system information. For example, signal strength and/or signal quality ranges corresponding to different coverage modes may be indicated by the serving cell in the system information. As another example, parameters for indicating which coverage mode a wireless device is requesting/using may be indicated. Other characteristics and/or parameters of the enhanced coverage mode and/or normal coverage mode may also be indicated by the serving cell. Alternatively, or in addition, some or all information defining the characteristics and parameters of the various coverage modes offered may be standardised and may thus be implied with an indication of a standard (and possibly version/release) according to which the serving cell operates.

In 506, the wireless device may determine to which coverage mode offered by the serving cell current radio conditions experienced by the wireless device correspond. As part of such determination, the wireless device may measure the current radio conditions experienced by the wireless device. For example, the wireless device may perform one or more serving cell measurements, which may measure signal strength, signal quality, and/or any other desired characteristics of the serving cell, as defined by reference signal received power (RSRP), reference signal received quality (RSRQ), signal to interference plus noise ratio (SINR), received signal strength indicator (RSSI), received signal code power (RSCP), Energy to Interference Ratio (Ec/Io), and/or any of various other possible metrics.

Once the current radio conditions (e.g., including signal strength/quality/etc.) have been measured, the wireless device may compare those radio conditions to the range(s) provided by the serving cell to determine into which range they fall, and accordingly which coverage mode would currently be appropriate for the wireless device.

In 508, the wireless device may trigger the serving cell to provide coverage according to the coverage mode corresponding to the current radio conditions experienced by the wireless device. For example, if the radio conditions for the wireless device are determined to correspond to the normal coverage mode (e.g., if measured signal strength and/or signal quality values fall within a range defined by the serving cell as corresponding to normal coverage), the wireless device may trigger the serving cell to provide normal coverage, and the wireless device may operate in the normal coverage mode. If the radio conditions for the wireless device are determined to have changed to correspond to the extended coverage mode (e.g., if measured signal strength and/or signal quality values have changed and now fall within a range defined by the serving cell as corresponding to extended coverage), the wireless device may trigger the serving cell to provide extended coverage, and the wireless device may operate in the extended coverage mode. Thus, the wireless device may dynamically adjust its coverage mode as determined to be appropriate, which may at least in part depend on the radio conditions experienced by the wireless device.

The wireless device may be able to determine to which coverage mode its current radio conditions correspond and to trigger the serving cell to provide coverage according to a particular coverage mode when the wireless device is operating in either of idle mode or connected mode, at least according to some embodiments.

According to some embodiments, the trigger to provide coverage according to a particular coverage mode may include performing a random access channel (RACH) procedure using a physical random access channel (PRACH) preamble associated with the desired coverage mode. As previously noted, the serving cell may have indicated parameters that can be used for indicating which coverage mode a wireless device is requesting/using, e.g., as part of its system information broadcasts; information indicating which PRACH preambles are associated with which coverage modes may be included among such indications, according to some embodiments. The trigger to provide coverage according to a particular coverage mode may also (or alternatively) include performing a mobility management (MM) action, such as performing a tracking area update (TAU) procedure with a mobility management entity (MME) serving the wireless device. In this way, both the base station providing the serving cell to the wireless device, and the MME that manages paging (among other mobility management operations) for the wireless device may be informed of the coverage mode according to which the wireless device is currently operating.

As a result of such triggering the serving cell (and potentially MME) to update the coverage mode of the wireless device, subsequent paging and other communication may be performed using the indicated coverage mode. For example, different control channels may be associated with paging when operating the normal coverage mode versus when operating in the enhanced coverage mode. Thus, after the wireless device triggers enabling of the enhanced coverage mode for the wireless device, when the MME determines to page the wireless device, the group of base stations attempting to page the wireless device may be informed that the wireless device is in the enhanced coverage mode, and may perform paging using the control channel associated with the enhanced coverage mode. If the wireless device then later determines that its radio conditions have again changed to correspond to the normal coverage mode and triggers enabling of the normal coverage mode for the wireless device, when the MME determines to page the wireless device, the group of base stations attempting to page the wireless device may be informed that the wireless device is in the normal coverage mode, and may perform paging using the control channel associated with the normal coverage mode.

As previously noted, being able to dynamically modify the coverage mode of a wireless device may improve the operating efficiency of the wireless device. For example, when radio conditions correspond to the enhanced coverage mode, the wireless device may be unable to successfully communicate using normal coverage mode communication techniques and parameters, so switching to the enhanced coverage mode may be necessary in order to allow the wireless device to communicate with the serving cell at all, and may reduce wasted power consumption from unsuccessful communication attempts. When radio conditions correspond to the normal coverage mode, the wireless device may be able to utilize more power-efficient communication techniques and/or may be able to obtain greater throughput, so switching to the normal coverage mode may improve the power consumption efficiency of the wireless device and/or allow for more extensive data communication.

However, it should be noted that in order for a wireless device to trigger a coverage mode switch for the wireless device, additional signaling traffic may be performed, at least according to some embodiments. For example, as noted above herein, at least in some instances a wireless device may trigger a coverage mode switch by performing a RACH procedure using a PRACH preamble associated with a coverage mode that is different than its current coverage mode. According to some embodiments, it may be desirable to limit such additional signaling. For example, according to some embodiments, a wireless device may be configured to implement a timer limiting the frequency of triggering coverage mode changes, and/or may implement a hysteresis with respect to the signal strength/quality ranges/values associated with different coverage modes. Accordingly, the following techniques may be used supplementally or as alternatives to the previously described techniques for triggering switching between coverage modes, e.g., to limit such additional signaling while still obtaining the benefits of multiple coverage modes to a substantial degree.

As one possible technique, in some embodiments a cellular network may be configured such that when the network is paging a wireless device, some initial number of attempts n may be performed using a control channel associated with the normal coverage mode, and if the wireless device does not respond to the paging attempts using the control channel associated with the normal coverage mode, some additional number of attempts m may be performed using a control channel associated with the enhanced coverage mode. The wireless device may be configured such that it monitors the control channel associated with the normal coverage mode for paging messages when radio conditions for the wireless device are in a range corresponding to the normal coverage mode, and monitors the control channel associated with the enhanced coverage mode for paging messages when radio conditions for the wireless device are in a range corresponding to the enhanced coverage mode. Further, if desired, the wireless device may monitor both the control channel associated with the normal coverage mode and the control channel associated with the enhanced coverage mode for paging messages when radio conditions for the wireless device are in a range between the range corresponding to the normal coverage mode and the range corresponding to the enhanced coverage mode.

Such a technique may still be susceptible to missed pages, for example if paging is being performed on the control channel that the wireless device is not monitoring; additionally, if a wireless device concurrently monitors multiple control channels for paging messages, this may consume more power than monitoring a single control channel for paging messages. Accordingly, as another (additional or alternative) possibility, a network may provide wireless devices with an option to request that paging always be performed using the control channel associated with the enhanced coverage mode. For example, according to LTE, when establishing a RRC connection, a UE radio access capability element indicating 'page on mPDCCH' as TRUE can be used to indicate to a base station to always perform paging for a wireless device using the mPDCCH. Based on receiving such an indication, the serving base station of the wireless device may indicate to the MME for the wireless device that the wireless device is in enhanced coverage, even if the wireless device is otherwise operating in (and experiencing radio conditions associated with) normal coverage. The MME may accordingly page the wireless device using the mPDCCH (e.g., as opposed to the PDCCH) when it has a paging message for the wireless device.

As a possible further consideration relating to in which coverage mode a wireless device chooses to operate, and as a more general consideration for improving operating efficiency, in some embodiments a wireless device may also monitor the data volume with which it expects to communicate in conjunction with the bandwidth of it's communication link. For example, in a communication system with variable bandwidth communication channels, such as LTE, there can be a substantial difference in a wireless device's power consumption when operating in a wideband communication mode (e.g., using a larger amount of bandwidth) versus when operating in a narrowband communication mode (e.g., using a smaller amount of bandwidth). Thus, at least in some instances, it may improve the power consumption profile of a wireless device to manage it's communication bandwidth such that smaller amounts of bandwidth can be used when data volumes are lower and larger amounts of bandwidth can be used (e.g., just as needed) when data volumes are higher.

Accordingly, FIG. 6 is a flowchart diagram illustrating a method for dynamically adjusting between communication bandwidths, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 6 may be implemented by a wireless device, such as a UE 106 or 107 illustrated in and described with respect to FIGS. 1-3 and/or a base station 102 such as illustrated in and described with respect to FIGS. 1, 2, and 4, or more generally in conjunction with any of the computer systems or devices shown in the above Figures, among other devices, as desired. Note that while at least some elements of the method of FIG. 6 are described in a manner relating to the use of communication techniques and/or features associated with LTE and/or 3GPP specification documents, such description is not intended to be limiting to the disclosure, and aspects of the method of FIG. 6 may be used in any suitable wireless communication system, as desired. As shown, the method may operate as follows.

In 602, the wireless device may determine a data volume for upcoming wireless communication with a cellular network. The wireless device may be camped on a serving cell associated with the cellular network, to which it may have attached and from which it may receive cellular communication services in a similar manner as described herein with respect to step 502 of FIG. 5.

Any of a variety of techniques may be used to determine the data volume for the upcoming wireless communication, according to various embodiments. As one possibility, determining the data volume for the upcoming wireless communication may include determining the volume of data buffered (e.g., at baseband and/or application layers) at the wireless device to be communicated with the cellular network. As another (additional or alternative) possibility, determining the data volume for the upcoming wireless communication may include determining one or more types of current and/or upcoming data activity at the wireless device. Since different applications (and more generally different types of applications) executing at the wireless device may have different typical data volumes to be communicated over time (e.g., may have different communication patterns), at least in some instances monitoring the type of data activity or activities occurring may be helpful in at least approximately predicting data volumes beyond the volume of data currently buffered for communication with the cellular network.

According to some embodiments, the wireless device may further determine how the determined data volume compares to one or more data volume thresholds. For example, the wireless device may determine whether the expected data volume is above or below a data volume threshold, e.g., to determine whether a relatively wideband communication bandwidth or a relatively narrowband communication bandwidth would be more suitable for the expected upcoming data volume. Multiple such data volume thresholds could be used if desired, e.g., to facilitate associating different ranges of expected data volumes with different possible communication bandwidths or bandwidth ranges. As another possibility, different possible communication bandwidths or bandwidth ranges may be associated directly with different types of data activities. For example, data activities with relatively low throughput requirements and/or priorities (e.g., voice calls, background/synchronization data transfers, etc., according to some embodiments) may be associated with narrower communication bandwidths, while data activities with relatively high throughput requirements and/ or priorities (e.g., streaming video, large downloads, etc., according to some embodiments) may be associated with wider communication bandwidths.

In 604, the wireless device may request a communication bandwidth for communicating with the serving cell based at least in part on the determined data volume. At least according to some embodiments, the wireless device may generally request wider communication bandwidth for higher data volumes and narrower communication bandwidth for lower data volumes. Note that any number of possible techniques or algorithms may be used by a wireless device to determine what communication bandwidth to request at any given time, and likewise the manner of requesting the desired communication bandwidth may vary considerably, e.g., depending on desired implementation details.

As discussed previously herein (e.g., with respect to FIG. 5), in at least some cellular communication systems, multiple coverage modes may be offered by at least some cells. In many instances, such different coverage modes may have different communication bandwidth profiles. For example, according to LTE release 13, CE mode A is limited to 1.4 MHz narrowband communication capable of supporting approximately 1 Mbps/1 Mbps uplink/downlink communication, while normal coverage mode can provide up to 20 MHz wideband communication capable of supporting approximately 5 Mbps/10 Mbps uplink/downlink communication. Note that other LTE releases or revisions, as well as other communication systems, can have different coverage modes with different communication bandwidth possibilities and supported throughput capabilities, and that these example values are not intended to be limiting to this disclosure.

Thus, in a communication system that offers multiple coverage modes with different communication bandwidth profiles, one possible way to effectively request a particular communication bandwidth (or at least a relative amount of bandwidth) may include requesting a particular coverage mode. For example, to request narrowband communication bandwidth, a wireless device may request that its serving cell provide CE mode service, while to request wideband communication bandwidth, the wireless device may request that its serving cell provide normal mode service, in some embodiments.

Note that in such a scenario (and potentially in other scenarios), a wireless device may also consider the current wireless medium (e.g., RF) conditions being experienced by the wireless device when determining the coverage mode (or communication bandwidth more generally) to request, e.g., as this may place a constraint on or otherwise influence which coverage mode/communication bandwidth to request. For example, if a wireless device is experiencing radio conditions that correspond to a CE mode, the wireless device may determine to request switching to (or may remain in) the CE mode, even if there is a larger data volume for upcoming wireless communication. Otherwise, the wireless device might determine to operate in the normal coverage mode when the volume of data for upcoming communication with the cellular network is associated with a relatively wideband communication bandwidth (e.g., if the expected data volume is above a data volume threshold) and when radio conditions for the wireless device correspond to the normal coverage mode. Similarly, the wireless device might determine to operate in the CE mode when the volume of data for upcoming communication with the cellular network is associated with a relatively narrowband communication bandwidth (e.g., if the expected data volume is below the data volume threshold), e.g., potentially even if the radio conditions for the wireless device correspond to the normal coverage mode.

Thus, in a system in which the communication bandwidth for communication between a wireless device and a cellular network can be requested by way of requesting or triggering a change in the coverage mode provided by the serving cell of the wireless device, similar signaling techniques as described herein with respect to FIG. 5 may be used to request a particular communication bandwidth or a communication bandwidth range, at least according to some embodiments.

Additionally or alternatively, in such a system or more generally in other possible wireless communication systems, it is also possible to utilize other signaling techniques for requesting a particular communication bandwidth or a communication bandwidth range. For example, according to some embodiments, a wireless device may provide a buffer status report to its serving cell, e.g., indicating its expected volume of data for upcoming communication, as an indicator of or request for a particular communication bandwidth or a communication bandwidth range. As another example, a media access control (MAC) control element or RRC message that is designed to allow a wireless device to request a communication bandwidth mode from multiple possible communication bandwidth modes may be defined, and a wireless device may provide such a MAC control element or RRC message to its serving cell to request a communication bandwidth mode.

Based on the communication bandwidth request, the serving cell may configure its service to the wireless device to use the requested communication bandwidth and/or confirm that its service to the wireless device will use the requested communication bandwidth. For example, an RRC connection reconfiguration message configuring and confirming the bandwidth mode (and/or coverage mode) may be provided to the wireless device in response to the communication bandwidth request, as one possibility. Other signaling messages or techniques may also or alternatively be used to confirm the use of the requested communication bandwidth, as desired.

In 606, the wireless device may communicate with the serving cell using the requested communication bandwidth. For example, the wireless device may perform uplink communication to transmit the data buffered at the wireless device for upcoming communication with the cellular network using the communication bandwidth, and/or may perform downlink communication to receive data from the cellular network via the serving cell using the communication bandwidth.

Note the requested communication bandwidth may relate just to uplink communication, just to downlink communication or to both uplink and downlink communication, as various possibilities. For example, there may be circumstances in which different communication bandwidths are preferable for downlink and uplink communication, and/or there may be communications systems with asymmetric uplink/downlink communication characteristics such that variable communication bandwidth is only possible in one direction, or such that possible communication bandwidth ranges differ for different communication directions, and/or such that communication characteristics differ in any of various other ways.

Note further that at least in some embodiments, when a wireless device has configured its communication link with its serving cell according to a particular communication bandwidth mode, the wireless device may also configure its RF circuitry to operate in an associated bandwidth mode. For example, if the communication link has been configured as a narrowband communication link (e.g., with a specified maximum communication bandwidth), the RF circuitry may likewise be configured to operate in a mode with similar bandwidth characteristics. Such RF configuration may help reduce power consumption by the wireless device, as at least in some instances the RF circuitry may consume more power when performing (or potentially even when configured to perform) wideband communication than when performing narrowband communication.

FIGS. 7-8

Figure 7:
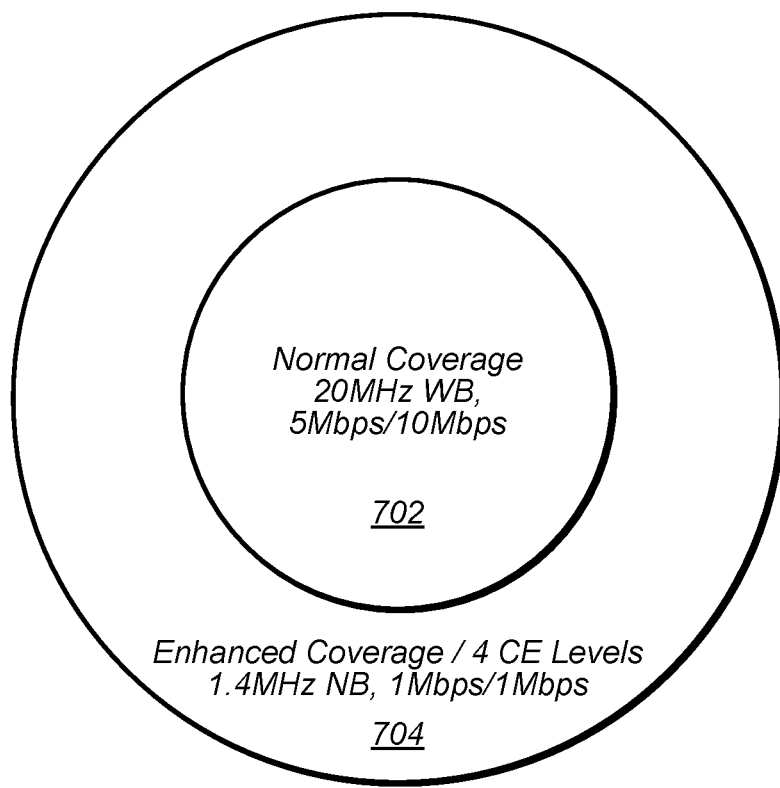
FIG. 7 illustrates exemplary possible normal and extended coverage cell ranges, according to some embodiments.
Figure 8:
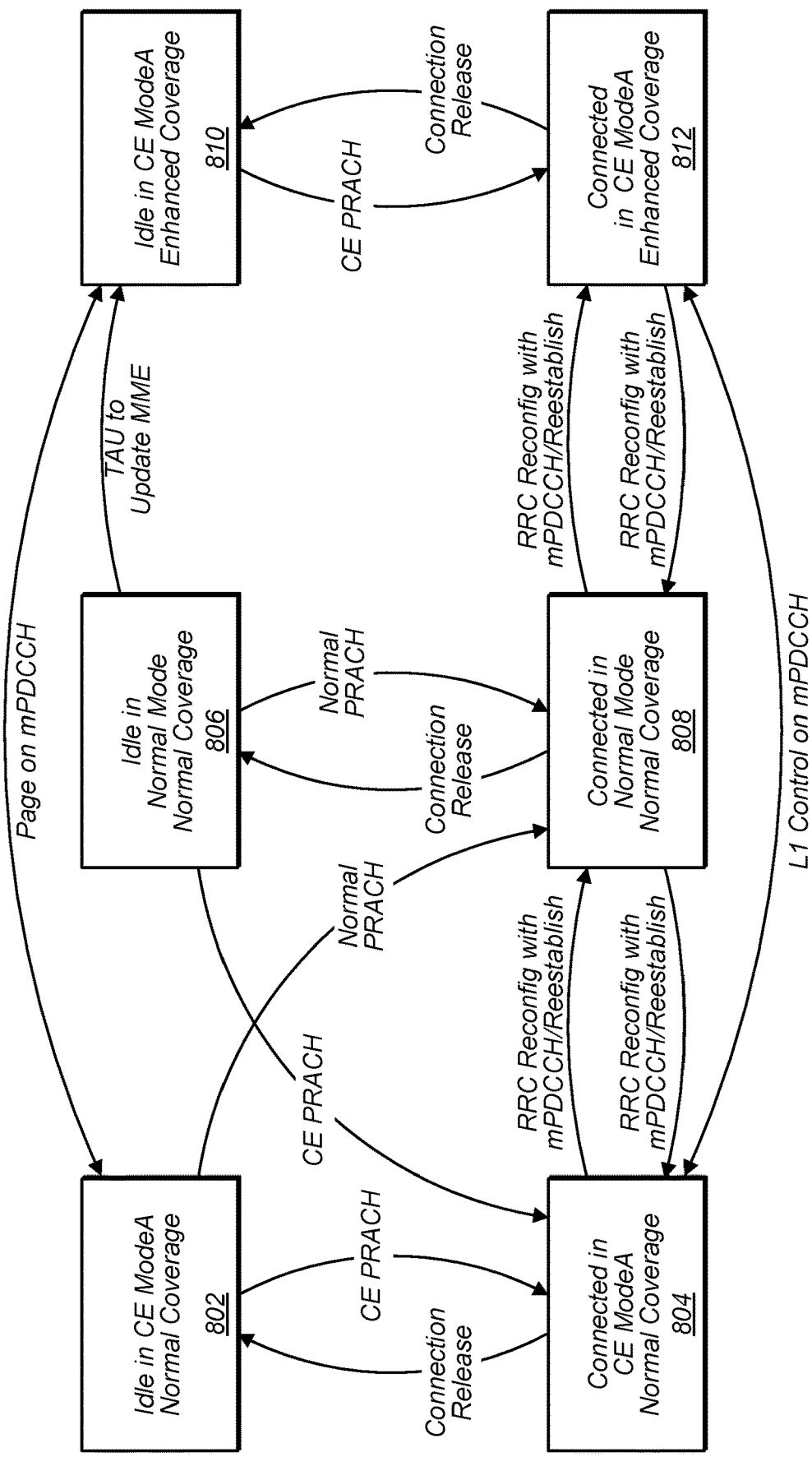
FIG. 8 illustrates an exemplary state diagram with possible state transitions for changing between normal and enhanced coverage modes based at least in part on data volume to manage communication bandwidth, according to some embodiments.

FIGS. 7-8 and the following additional information, which relate to possible characteristics and parameters of a possible enhanced coverage mode in an example cellular communication system that operates according to LTE release 13, are provided as being illustrative of further considerations and possible implementation details of the methods of FIGS. 5-6, and are not intended to be limiting to the disclosure as a whole. Numerous variations and alternatives to the details provided herein below are possible and should be considered within the scope of the disclosure.

3GPP Release 13 defines LTE cell coverage as normal coverage and enhanced coverage. Enhanced coverage is the coverage beyond normal coverage, e.g., for which RSRP measurement is less than cell selection criterion based on Qrxlevmin and Qqualmin. Further more, enhanced coverage is defined to have 4 levels (0/1/2/3), e.g., based on different RSRP thresholds, and in each CE level, there is a corresponding PRACH preamble group associated with it. So an eNodeB can detect if a UE is in enhanced coverage and in which CE level by detecting that the PRACH preamble used by a UE for random access belongs to a particular CE level associated with that PRACH preamble group.

As one possibility for defining criteria for normal coverage, if cell selection criterion S (Qrxlevmin and Qqualmin) is fulfilled for a cell, a UE is be considered to be in normal coverage. If the UE is not in normal coverage, but cell selection criterion S for enhanced coverage (Qrxlevmin_CE and Qqualmin_CE from CE SIB1) is fulfilled, the UE may be considered to be in enhanced coverage.

When a UE is in enhanced coverage, ranking with cell selection criterion S for enhanced coverage may be applied for intra- and inter-cell re-selection.

According to some embodiments, multiple Coverage Enhancement (CE) Levels may be defined. For example, enhanced coverage may have 4 levels, defined by RSRP thresholds provided by CE SIB2, also called PRACH CE level 0, 1, 2 and 3. According to some embodiments, if a UE is in CE level 0/1, it shall assume CE Mode A, while if UE is in CE level 2/3, it shall assume CE mode B.

FIG. 7 illustrates an example of possible normal coverage and enhanced coverage ranges for a cell, according to some embodiments. As shown, in the normal coverage range 702, radio conditions may generally be sufficiently good to support wideband communication using bandwidths of up to 20 MHz with possible uplink/downlink throughput of 5 Mbps/10 Mbps. The enhanced coverage range 704 may be larger (e.g., may extend a further distance from a base station providing the cell) than the normal coverage range, and may potentially include areas with insufficient radio conditions to support the bandwidths and/or throughput levels of the normal coverage range. Radio conditions in the enhanced coverage range 704 may be sufficient, however, to support narrowband communication using 1.4 MHz with possible uplink/downlink throughput of 1 Mbps/1 Mbps, e.g., at least when using the communication techniques associated with the enhanced coverage modes.

As noted previously herein at least with respect to FIG. 6, at least in some embodiments it may be possible to leverage the different communication bandwidth characteristics of such different coverage modes to operate more efficiently based at least in part on expected upcoming data volume, e.g., in addition to the actual coverage conditions. Accordingly, FIG. 8 illustrates an example state diagram for dynamically switching between coverage modes in normal and enhanced coverage conditions based at least in part on a desired communication bandwidth, according to some embodiments.

In the example scenario of FIG. 8, a wireless device may be capable of operating in an idle mode or in a connected mode, as well as in a CE mode (e.g., CE mode A) or in a normal coverage mode. The wireless device may in some circumstances operate in the CE mode even when in normal coverage conditions, but may generally not operate in the normal coverage mode when in enhanced coverage conditions. Thus, the possible states illustrated in FIG. 8 may include operating in idle mode and CE mode while in normal coverage conditions (802) and operating in connected mode and CE mode while in normal coverage conditions (804), which may be selected for low data volumes to potentially conserve power; operating in idle mode and normal coverage mode while in normal coverage conditions (806) and operating in connected mode and normal coverage mode while in normal coverage conditions (808), which may be selected for high data volumes when coverage conditions permit; and operating in idle mode and CE mode while in enhanced coverage conditions (810) and operating in connected mode and CE mode while in enhanced coverage conditions (812), which may be selected regardless of data volumes when coverage conditions are sufficient for enhanced coverage but insufficient for normal coverage.

As shown, FIG. 8 also illustrates a variety of signaling techniques that can be used when in the various illustrated states and to transition between the illustrated states. The signaling techniques include techniques for transitioning from idle to connected mode, which may include the wireless device using CE PRACH preambles to establish an RRC connection to transition from idle CE or normal mode to connected CE mode (whether in normal or enhanced conditions), and using normal PRACH preambles to establish an RRC connection to transition from idle normal coverage mode or idle CE mode in normal coverage conditions to connected normal mode in normal conditions. In all cases of transitioning from connected mode to idle mode, a connection release message may be provided from the serving cell to the wireless device, and may transition the wireless device from connected mode to idle mode without modifying whether the wireless device is in the normal mode or the CE mode.

When operating in idle and CE modes, whether in normal coverage conditions or enhanced coverage conditions, the network may perform paging using the mPDCCH, while when operating in idle and normal coverage modes, the network may perform paging using the PDCCH. As shown, the wireless device may be able to perform a tracking area update (TAU) procedure with the network to transition from idle and normal coverage modes when in normal coverage conditions to idle and CE modes when in enhanced coverage conditions, e.g., to better enable the wireless device to receive paging messages in view of the enhanced coverage conditions.

When operating in connected mode, the wireless device may be able to perform RRC reconfiguration to transition from the normal coverage mode to the CE mode (e.g., to configure the use of the mPDCCH for paging), whether remaining in normal coverage conditions or moving to enhanced coverage conditions. Similarly, the wireless device may be able to perform RRC reconfiguration to transition from the CE mode to the normal coverage mode (e.g., to configure the use of the PDCCH for paging), whether already in normal coverage conditions or moving to normal coverage conditions. As also shown, L1 control on mPDCCH may be used when operating in connected and CE modes (whether in normal or enhanced coverage conditions); L1 control on PDCCH may be used when operating in connected and normal coverage mode.

The following information includes further possible details of LTE release 13 enhanced coverage mode characteristics and parameters, is provided for exemplary illustrative purposes, and is not intended to be limiting to this disclosure as a whole.

A wireless device may be categorized according to its device category with respect to LTE, according to some embodiments. For example, consider a category 1 LTE device, e.g., a device that is UL Category 1 and DL category 1. For such a device, a e-HARQ-pattern-FDD-r12 parameter may define whether the UE supports an enhanced HARQ pattern for TTI bundling operation for FDD, e.g., with 4 TTI bundling, 3 HARQ processes, and round trip time (RTT) of 12 ms. A ce-ModeA-r13 parameter may define whether the UE supports operation in CE mode A and PRACH CE level 0 and 1 at Random Access. A intraFreqA3-CE-ModeA-r13 parameter may define whether the UE when operating in CE mode A supports eventA3 for intra neighboring cells in normal coverage and CE mode A. A intraFreqHO-CE-ModeA-r13 parameter may define whether the UE when operating in CE mode A supports intra handover to target cell in normal coverage and CE mode A.

A new 32 bits signature in a MIB provided by a cell may be used to indicate if CE SIB1 is scheduled and its transport block size and number of repetitions. Such a signature may indicate that the cell supports CE features defined by 3GPP R13; a signature value of 0 may mean that the CE feature is not supported.

If CE features are supported by the cell, a CE SIB1 for Coverage Enhancement may be provided by the cell. A larger SI window length and repetition pattern may be used for CE SIBs. A narrow band (e.g., contiguous 6PRBs) and transport block size may also be used for CE SIBs. Additionally, a frequency hopping configuration may be used for CE SIBs. A CE SIB2 for Coverage Enhancement may also be provided. The CE SIBs may indicate CE PRACH configurations and CE mPDCCH/PDSCH/PUSCH/PCH common configurations.

Each CE level supported by a serving cell may be associated with a set of PRACH resources for transmission of Random Access Preambles. The CE level for a UE may be selected based on serving cell RSRP measurement and CE SIB2 rsrp-ThresholdsPrachInfoList. The maximum number of preamble transmission attempts (3/4/5/6/7/8/10) per each CE level may be provided by the CE SIB2. The number of repetitions (1/2/4/8/16/32/64/128) required for preamble transmission per attempt for each CE level may also be provided by the CE SIB2. Additionally, the narrow bands to monitor for the mPDCCH for a RAR in each CE level, the number of repetitions for mPDCCH common search space for RAR, msg3 and msg4, and the RA response window size and contention resolution Timer per CE level may all be provided by the CE SIB2.

If a UE is in enhanced coverage, it shall select a PRACH preamble for random access based on its corresponding CE level. The UE may transmit a preamble with corresponding number of repetitions, RA_RNTI, preamble ind and target power.

If the UE fails on max number of random access attempts on one CE level, it shall try to random access on next CE level.

The msg3 PUSCH repetition number may be indicated in the RAR received from the network.

A parameter PUCCH-NumRepetitionCE may provide a number of PUCCH repetitions for PUCCH format 1/1a/2/2a/2b for CE mode A.

A parameter PUCCH-numRepetitionCE-msg4-level0/1/2/3 may provide a number of repetitions for PUCCH carrying HARQ response to PDSH containing msg4 for PRACH CE level 0/1/2/3.

One paging occasion (PO) in a CE mode may include a subframe in which a P-RNTI is transmitted on the mPDCCH. The subframe may be determined by the UE based on its IMSI, DRX cycle, and number of paging narrow bands (Nn) provided in CE SIB2.

The mPDCCH carrying a PO can be repeated multiple times, e.g., as defined by the parameter mPDCCH-Num-Repetition-Paging-R13 in CE SIB2.

Information on the coverage enhancement (CE) level, if available for the UE, may be provided transparently by the serving eNB to the MME at transition to ECM_IDLE together with the respective cell identifier, and may be provided to the E-UTRAN during paging. Paging attempt information may always be provided to all paged eNBs for UEs for which the information on the coverage enhancement level has been received.

If paging attempt information is included in the paging message, each paged eNB may receive the same information during a paging attempt. The paging attempt count may be increased by one at each new paging attempt. The next paging area scope, when present, indicates whether the MME plans to modify the paging area currently selected at next paging attempt. If the UE has changed its mobility state to ECM CONNECTED the Paging Attempt Count is reset.

A PUSCH transmission in an enhanced coverage mode can be in a N-subframe TTI bundle indicated by mPDCCH. A parameter PUSCH-maxNumRepetitionCEmodeA-r13, having a value of 8/16/32, may indicate a maximum value to indicate the set of PUSCH repetition numbers for CE mode A, e.g., among the following possibilities: {1, 2, 4, 8}, {1, 4, 8, 16}, {1, 4, 16, 32}. A parameter PUSCH-maxNumRepetionCEmodeB-r13, having a value of 192/256/ . . . /2048, may indicate a maximum value to indicate the set of PUSCH repetition numbers for CE mode B. The PUSCH bandwidth may be limited to 6PRB, according to some embodiments. Uplink HARQ operation may be asynchronous for UEs in enhanced coverage except for the receptions within a bundle.

A PDSCH transmission in an enhanced coverage mode can be in a N-subframe TTI bundle indicated by mPDCCH. A parameter PDSCH-maxNumRepetionCEmodeA-r13, having a value of 8/16/32, may indicate a maximum value to indicate the set of PDSCH repetition numbers for CE mode A, e.g., among the following possibilities: {1, 2, 4, 8}, {1, 4, 8, 16}, {1, 4, 16, 32}. A parameter PDSCH-maxNumRepetionCEmodeB-r13, having a value of 192/256/ . . . /2048, may indicate a maximum value to indicate the set of PDSCH repetition number for CE mode B. The PDSCH bandwidth may be limited to 6PRB, according to some embodiments.

The mPDCCH provided in an enhanced coverage mode may utilize a repetition level among the following repetition levels: {1, 2, 4, 8, 16, 32, 64, 128, 256}. The mPDCCH aggregation level may be among the following aggregation levels: {1, 2, 4, 8, 16, 12, 24}. The mPDCCH bandwidth may be limited to 6PRB, according to some embodiments.

An existing NW configuration for VoLTE may include PUSCH 4TTIB, 4HARQ, HARQ RTT 16 ms, with one/two audio packet bundling, TBS 208 bits/328 bits, segment 144/176 bits, 4 HARQ transmissions. An increase in HARQ transmissions from 4 to 7 could result in a link budget gain (e.g., ~2 dB, as one possibility).

A possible mPDCCH/PUSCH configuration in CE mode A could include PUSCH 8TTIB, 3 HARQ, HARQ RTT 24 ms, mPDCCH with 4 repetitions. For one audio packet bundling, TBS 208 bits, segment 144/176 bits, 5/6/7 HARQ transmissions could be used. For two audio packet bundling, TBS 328 bits, segment 144/176 bits, 5/6/7 HARQ transmissions could be used. This may provide a potential UL link budget gain of ~4-5 dB, as one possibility.

Another possible mPDCCH/PUSCH in CE mode A could include PUSCH 8TTIB, 2 HARQ, HARQ RTT 16 ms, mPDCCH with 2 repetitions. For one audio packet bundling, TBS 208 bits, segment 144/176 bits, HARQ 8/9/10 transmissions could be used. For two audio packet bundling, TBS 328 bits, segment 144/176 bits, HARQ 8/9/10 transmissions could be used. This may provide a potential UL link budget gain of ~6 dB-7 dB, as one possibility.

Another possible mPDCCH/PUSCH in CE mode A could include PUSCH 4TTIB, 3 HARQ, HARQ RTT 12 ms, mPDCCH with 2 repetitions. For one audio packet bundling, TBS 208 bits, segment 144/176 bits, HARQ 10/11/12 transmissions could be used. For two audio packet bundling, TBS 328 bits, segment 144/176 bits, HARQ 10/11/12 transmissions could be used. This may provide a potential UL link budget gain of ~4 dB-5 dB, as one possibility.

For a UE with category 1 and above, when in a coverage beyond normal coverage, in order to not go out-of-service (OOS), it may be possible for a wireless device to dynamically utilize coverage enhancement feature if it is supported by eNodeB. As part of such techniques, when a cell is selected as serving cell to camp on, a UE may determine if the cell supports 3GPP R13 coverage enhancement feature by checking if the CE signature present in MIB. If CE is supported on the serving cell, the UE may store CE SIBS for CE level thresholds, CE PRACH and mPDCCH configurations.

When in idle mode, based on serving cell measurements, the UE may determine if it is in normal coverage or enhanced coverage and its corresponding CE level. If the UE is entering enhanced coverage from normal coverage, UE may utilize the configuration information from the CE SIBs to establish a mobility management connection (perform a TAU or send any other MM message) to update its MME to switch to CE mode idle paging. The UE may switch to listen to the mPDCCH for idle paging. When the MME eventually pages the UE, the MME may send the UE's CE level information and page attempt count information to a group of eNodeBs. Each eNodeB in the group may thus determine to page the UE on the mPDCCH if the UE is in enhanced coverage, and may otherwise page the UE on the PDCCH. Additionally, the UE's intra/inter cell re-selection may be based on cell selection criterion S for enhanced coverage (e.g., instead of cell selection criterion S for normal coverage).

If the UE is entering normal coverage from enhanced coverage, the UE may continue to listen to the mPDCCH for idle paging, or may establish a mobility management connection (e.g., perform a TAU) to update MME to switch to normal mode idle paging, in which case the UE may switch to listen to the PDCCH for idle paging. Additionally, its intra/inter cell re-selection may be based on cell selection criterion S for normal coverage (e.g., instead of cell selection criterion S for enhanced coverage).

When establishing a RRC connection, if the UE is in normal coverage, it may select a PRACH preamble for normal coverage for performing a random access procedure. If the UE is in enhanced coverage, it may select a PRACH preamble from the corresponding enhanced coverage level for performing a random access procedure.

When exiting a RRC connection, if the UE is in normal coverage, it may enter idle mode in normal coverage, read normal SIBs, and listen to the PDCCH for idle paging. If the UE is in enhanced coverage, it may enter idle mode in enhanced coverage, read CE SIBS, and listen to the mPDCCH for idle paging.

During an RRC connection, if the UE is entering enhanced coverage from normal coverage, the UE may use a PRACH preamble from its corresponding CE level to re-establish the RRC connection; or, alternatively, the NW may reconfigure the RRC connection to use the mPDCCH, e.g., based on a UE triggered measurement report. If the UE is entering normal coverage from enhanced coverage, the UE may use a PRACH preamble for normal coverage to re-establish the RRC connection; or, alternatively, the may NW reconfigure the RRC connection to use the PDCCH, e.g., based on a UE triggered measurement report. The NW may perform NW triggered HO from a cell in enhanced coverage to a cell in normal coverage, or a cell in normal coverage to a cell in enhanced coverage. The UE may trigger RRC re-establishment to a cell in normal coverage from a cell in enhanced coverage, or from a cell in normal coverage to a cell in enhanced coverage.

In the following further exemplary embodiments are provided.

One set of embodiments may include a method for a wireless device, comprising: attaching to a serving cell associated with a cellular network; determining a volume of data for upcoming communication with the cellular network; providing an indication of a requested communication bandwidth to the serving cell; and communicating data with the serving cell using the requested communication bandwidth.

According to some embodiments, the method further comprises determining whether the volume of data is above a data volume threshold.

According to some embodiments, the indication of the requested communication bandwidth comprises a buffer status report indicating the volume of data for upcoming communication with the cellular network.

According to some embodiments, the indication of the requested communication bandwidth comprises a media access control (MAC) control element or a radio resource control (RRC) message requesting a communication bandwidth mode from a plurality of possible communication bandwidth modes.

According to some embodiments, the indication of the requested communication bandwidth comprises one of: a request for a wideband communication bandwidth; or a request for a narrowband communication bandwidth.

According to some embodiments, the method further comprises: configuring RF circuitry of the wireless device to operate in a narrowband communication mode or a wideband communication mode based at least in part on providing the indication of the requested communication bandwidth.

According to some embodiments, communicating data with the serving cell using a wideband communication bandwidth comprises operating in a normal coverage mode, wherein communicating data with the serving cell using a narrowband communication bandwidth comprises operating in a coverage enhancement mode.

Another set of embodiments may include a method for a wireless device, comprising: attaching to a serving cell associated with a cellular network; determining that the serving cell supports a normal coverage mode and a coverage enhancement (CE) mode; determining whether radio conditions for the wireless device correspond to the normal coverage mode or the CE mode; determining a volume of data for upcoming communication with the cellular network; determining whether to operate in the normal coverage mode or the CE mode based in least in part on the radio conditions and the volume of data; and providing an indication to the serving cell to enable the determined mode for the wireless device.

According to some embodiments, the method further comprises: determining to operate in the normal coverage mode when radio conditions for the wireless device correspond to the normal coverage mode and the volume of data for upcoming communication with the cellular network is above a data volume threshold; and determining to operate in the CE mode when radio conditions for the wireless device correspond to the CE mode or when the volume of data for upcoming communication with the cellular network is below the data volume threshold.

According to some embodiments, the method further comprises: configuring RF circuitry of the wireless device to operate in a narrowband communication mode when the CE mode is enabled; and configuring RF circuitry of the wireless device to operate in a wideband communication mode when the normal coverage mode is enabled.

According to some embodiments, determining the volume of data comprises determining one or more types of current data activity at the wireless device.

A further set of embodiments may include a method for a wireless device, comprising: camping on a serving cell provided by a base station; determining that the serving cell supports a normal coverage mode and a coverage enhancement (CE) mode; determining that radio conditions for the wireless device correspond to the normal coverage mode; operating in the normal coverage mode based at least in part on determining that radio conditions for the wireless device correspond to the normal coverage mode; determining that radio conditions for the wireless device have changed to correspond to the CE mode; and providing an indication to the base station to enable the CE mode for the wireless device based at least in part on determining that radio conditions for the wireless device have changed to correspond to the CE mode.

According to some embodiments, determining that radio conditions for the wireless device have changed to correspond to the CE mode and providing the indication to the base station to enable the CE mode for the wireless device are performed while the wireless device is in an idle mode.

According to some embodiments, determining that radio conditions for the wireless device have changed to correspond to the CE mode and providing the indication to the base station to enable the CE mode for the wireless device are performed while the wireless device is in a connected mode.

According to some embodiments, providing the indication to the base station to enable the CE mode for the wireless device comprises performing a random access channel procedure using a physical random access channel preamble associated with the CE mode.

According to some embodiments, providing the indication to the base station to enable the CE mode for the wireless device causes the base station to perform idle mode paging using a different control channel than when operating in the normal coverage mode.

According to some embodiments, the serving cell is associated with a cellular network, wherein the cellular network further comprises a mobility management entity, and the method further comprises: providing an indication to the mobility management entity to enable the CE mode for the wireless device based at least in part on determining that radio conditions for the wireless device have changed to correspond to the CE mode.

According to some embodiments, the method further comprises: monitoring a control channel associated with the normal coverage mode when radio conditions for the wireless device are in a first range corresponding to the normal coverage mode; monitoring a control channel associated with the CE mode when radio conditions for the wireless device are in a second range corresponding to the CE mode; and monitoring both the control channel associated with the normal coverage mode and the paging channel associated with the CE mode when radio conditions for the wireless device are in a range between the first range and the second range.

According to some embodiments, wherein the method further comprises: providing an indication to the base station to always perform idle mode paging using a control channel associated with the CE mode; and monitoring the control channel associated with the CE mode both when radio conditions for the wireless device correspond to the normal coverage mode and when radio conditions for the wireless device correspond to the CE mode.

According to some embodiments, the method further comprises: determining that radio conditions for the wireless device have changed to correspond to the normal coverage mode; and providing an indication to the base station to enable the normal coverage mode for the wireless device based at least in part on determining that radio conditions for the wireless device have changed to correspond to the normal coverage mode.

A further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a base station to:
establish a radio resource control (RRC) connection with a wireless device served by a serving cell provided by the base station;
receive a first RRC message from the wireless device, wherein the first RRC message comprises a first indication of a preferred uplink communication bandwidth mode and a second indication of a preferred downlink communication bandwidth mode;
wherein the preferred uplink communication bandwidth mode is one of a plurality of uplink communication bandwidth modes, wherein the preferred uplink communication bandwidth mode comprises a first maximum uplink communication bandwidth for a physical uplink shared channel (PUSCH) of the serving cell, wherein at least one of the plurality of uplink communication bandwidth modes comprises a maximum uplink communication bandwidth of 1.4 MHz;
wherein the preferred downlink communication bandwidth mode is one of a plurality of downlink communication bandwidth modes, wherein the preferred downlink communication bandwidth mode comprises a first maximum downlink communication bandwidth for a physical downlink shared channel (PDSCH) of the serving cell, wherein at least one of the plurality of downlink communication bandwidth modes comprises a maximum downlink communication bandwidth of 1.4 MHz;
transmit, to the wireless device, a second RRC message configuring and confirming the preferred uplink communication bandwidth mode and the preferred downlink communication bandwidth mode in response to the first RRC message; and
communicate data with the wireless device using the preferred uplink communication bandwidth mode and the preferred downlink communication bandwidth mode.

2. The apparatus of claim 1, wherein the processor is further configured to cause the base station to:
when the wireless device is in a connected mode of operation after establishing the RRC connection with the wireless device, communicate with the wireless device in a second uplink communication bandwidth mode and a second downlink communication bandwidth mode, wherein the second uplink and downlink communication bandwidth modes are limited, respectively, to the maximum uplink communication bandwidth of 1.4 MHz and the maximum downlink communication bandwidth of 1.4 MHz; and
when the wireless device is in an idle mode of operation after establishing the RRC connection with the wireless device, transmit, to the wireless device, a paging indication using a narrowband physical control channel according to the second downlink communication bandwidth mode.

3. The apparatus of claim 1, wherein the processor is further configured to cause the base station to:
advertise a first coverage mode supported by the base station.

4. The apparatus of claim 3, wherein the processor is further configured to cause the base station to:
indicate a first signal strength range associated with the first coverage mode.

5. The apparatus of claim 3, wherein the processor is further configured to cause the base station to:
indicate a first signal quality range associated with the first coverage mode.

6. The apparatus of claim 1, wherein the processor is further configured to cause the base station to:
receive, from the wireless device, an indication of a second preferred uplink communication bandwidth mode; and
communicate with the wireless device using the second preferred uplink communication bandwidth mode.

7. The apparatus of claim 1, wherein at least one of a maximum uplink communication bandwidth or a maximum downlink communication bandwidth is configured separately from a coverage mode.

8. A base station, comprising:
a radio; and
a processor operably connected to the radio and configured to cause the base station to:
establish a radio resource control (RRC) connection with a wireless device served by a serving cell provided by the base station;
receive a first RRC message from the wireless device, wherein the first RRC message comprises a first indication of a preferred uplink communication bandwidth mode and a second indication of a preferred downlink communication bandwidth mode;
wherein the preferred uplink communication bandwidth mode is one of a plurality of uplink communication bandwidth modes, wherein the preferred uplink communication bandwidth mode comprises a first maximum uplink communication bandwidth for a physical uplink shared channel (PUSCH) of the serving cell, wherein at least one of the plurality of uplink communication bandwidth modes comprises a maximum uplink communication bandwidth of 1.4 MHz;

wherein the preferred downlink communication bandwidth mode is one of a plurality of downlink communication bandwidth modes, wherein the preferred downlink communication bandwidth mode comprises a first maximum downlink communication bandwidth for a physical downlink shared channel (PDSCH) of the serving cell, wherein at least one of the plurality of downlink communication bandwidth modes comprises a maximum downlink communication bandwidth of 1.4 MHz;

transmit, to the wireless device, a second RRC message configuring and confirming the preferred uplink communication bandwidth mode and the preferred downlink communication bandwidth mode in response to the first RRC message; and communicate data with the wireless device using the preferred uplink communication bandwidth mode and the preferred downlink communication bandwidth mode.

9. The base station of claim 8, wherein the processor is further configured to cause the base station to:

when the wireless device is in a connected mode of operation after establishing the RRC connection with the wireless device, communicate with the wireless device in a second uplink communication bandwidth mode and a second downlink communication bandwidth mode, wherein the second uplink and downlink communication bandwidth modes are limited, respectively, to the maximum uplink communication bandwidth of 1.4 MHz and the maximum downlink communication bandwidth of 1.4 MHz; and when the wireless device is in an idle mode of operation after establishing the RRC connection with the wireless device, transmit, to the wireless device, a paging indication using a narrowband physical control channel according to the second downlink communication bandwidth mode.

10. The base station of claim 8, wherein the processor is further configured to cause the base station to:

advertise a first coverage mode supported by the base station.

11. The base station of claim 10, wherein the processor is further configured to cause the base station to:

indicate a first signal strength range associated with the first coverage mode.

12. The base station of claim 10, wherein the processor is further configured to cause the base station to:

indicate a first signal quality range associated with the first coverage mode.

13. The base station of claim 8, wherein the processor is further configured to cause the base station to:

receive, from the wireless device, an indication of a second preferred uplink communication bandwidth mode; and communicate with the wireless device using the second preferred uplink communication bandwidth mode.

14. The base station of claim 8, wherein at least one of a maximum uplink communication bandwidth or a maximum downlink communication bandwidth is configured separately from a coverage mode.

15. A method for operating a base station, the method comprising:

at the base station:

establishing a radio resource control (RRC) connection with a wireless device served by a serving cell provided by the base station;

receiving a first RRC message from the wireless device, wherein the first RRC message comprises a first indication of a preferred uplink communication bandwidth mode and a second indication of a preferred downlink communication bandwidth mode;

wherein the preferred uplink communication bandwidth mode is one of a plurality of uplink communication bandwidth modes, wherein the preferred uplink communication bandwidth mode comprises a first maximum uplink communication bandwidth for a physical uplink shared channel (PUSCH) of the serving cell, wherein at least one of the plurality of uplink communication bandwidth modes comprises a maximum uplink communication bandwidth of 1.4 MHz;

wherein the preferred downlink communication bandwidth mode is one of a plurality of downlink communication bandwidth modes, wherein the preferred downlink communication bandwidth mode comprises a first maximum downlink communication bandwidth for a physical downlink shared channel (PDSCH) of the serving cell, wherein at least one of the plurality of downlink communication bandwidth modes comprises a maximum downlink communication bandwidth of 1.4 MHz;

transmitting, to the wireless device, a second RRC message configuring and confirming the preferred uplink communication bandwidth mode and the preferred downlink communication bandwidth mode in response to the first RRC message; and communicating data with the wireless device using the preferred uplink communication bandwidth mode and the preferred downlink communication bandwidth mode.

16. The method of claim 15, the method further comprising:

when the wireless device is in a connected mode of operation after establishing the RRC connection with the wireless device, communicating with the wireless device in a second uplink communication bandwidth mode and a second downlink communication bandwidth mode, wherein the second uplink and downlink communication bandwidth modes are limited, respectively, to the maximum uplink communication bandwidth of 1.4 MHz and the maximum downlink communication bandwidth of 1.4 MHz; and when the wireless device is in an idle mode of operation after establishing the RRC connection with the wireless device, transmitting, to the wireless device, a paging indication using a narrowband physical control channel according to the second downlink communication bandwidth mode.

17. The method of claim 15, the method further comprising:

advertising a first coverage mode supported by the base station.

18. The method of claim 17, the method further comprising:

indicating a first signal strength range associated with the first coverage mode.

19. The method of claim 15, the method further comprising:
receiving, from the wireless device, an indication of a second preferred uplink communication bandwidth mode; and
communicating with the wireless device using the second preferred uplink communication bandwidth mode.

20. The method of claim 15, wherein at least one of a maximum uplink communication bandwidth or a maximum downlink communication bandwidth is configured separately from a coverage mode.

* * * * *